Sept. 2, 1941.　　　A. A. DUBAY　　　2,254,797

TRAILER COUPLING FOR BICYCLES

Filed March 25, 1941

INVENTOR.
Alban A. Dubay
BY James Hamilton
ATTORNEY

Patented Sept. 2, 1941

2,254,797

UNITED STATES PATENT OFFICE 2,254,797

TRAILER COUPLING FOR BICYCLES

Alban A. Dubay, Lawrence, Mass.

Application March 25, 1941, Serial No. 385,050

4 Claims. (Cl. 280—204)

My present invention relates to couplings, and more particularly to couplings for bicycles having attached trailers, particularly of the two-wheel type.

In my present invention, I provide a coupling between the rear axle of the bicycle and the trailer in which the bicycle may lean to the right or left and at the same time turn, as when making a curve, while the trailer remains in an upright position. In other words, I provide a universal movement in the coupling between the bicycle and the trailer, and at the same time I provide a very quick attachable and detachable apparatus requiring no tools in operation.

The principal object of my invention, is an improved coupling between bicycles and trailers;

Another object is an anti-rattling device for couplings between bicycles and bicycle trailers;

A still further object is a locking apparatus for coupling apparatus between trailers and bicycle apparatus, and Other objects and novel features comprising the construction and operation of my invention will appear as the description of the invention progresses.

In the drawing illustrating the preferred embodiment of my invention:

Figure 1:
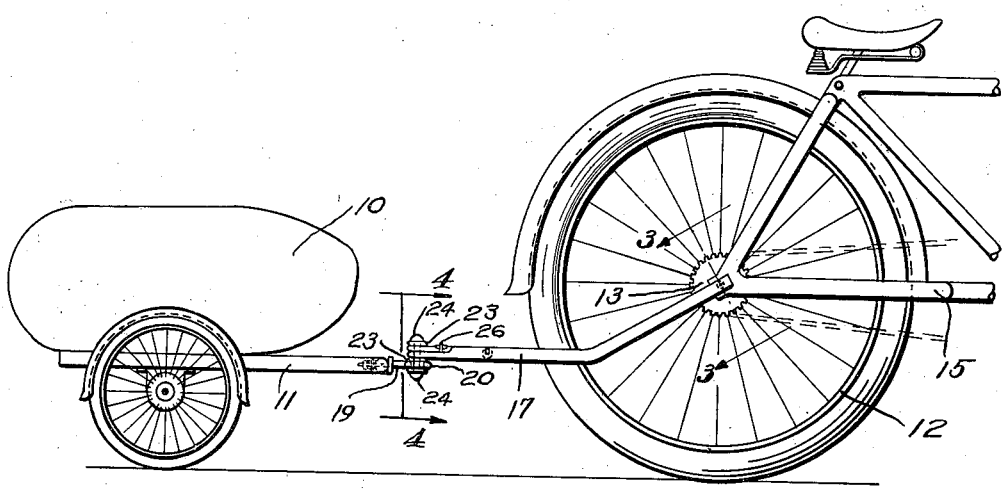
Fig. 1 is a side elevation of the coupling attachment, the trailer, to the right-hand side of the view is intended to represent a two-wheel apparatus, the bicycle to the right-hand side of the view shows the rear wheel, in which the invention is concerned, the forward portion of the bicycle having been eliminated for convenience.
Figure 2:
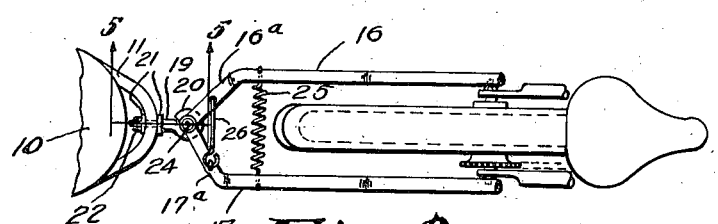
Fig. 2 is a fragmentary plan view of the apparatus, a portion of the trailer and bicycle having been cut away.

Referring more in detail to the drawing, 10 indicates a trailer having a chassis 11 of tubular cross-section. It is to be understood that the chassis 11 may be of any form as square tubular form or solid.

The rear wheel 12 of the bicycle is provided with the conventional rear sprocket 13 and rear axle 14, and is mounted in the usual bicycle frame 15.

My invention comprises the apparatus located between the rear axle 14 of the bicycle and the chassis 11 of the trailer 10.

At 16 and 17 I have indicated fork members. These fork members are preferably formed of tubular material, as shown, the forward inner sides of which are provided with openings which fit over the extension ends of the rear axle 14, as indicated at 14a and 14b. These fork members 16 and 17 preferably extend to the rear in a downward direction, as shown in Fig. 1, and thence to the rear for a distance sufficient to clear the rear wheel 12, and are then bent inwardly as indicated at 16a and 17a, to a common pivot point 16b and 17b.

Horizontally mounted through the forward portion of the trailer chassis 11 is a bolt member 19 the forward portion of which is shouldered and provided with an eye member 20. Collars 21 may be located under the shouldered portion and back of the tubular member 11, the usual nuts 22 are provided back of the curved tubular member 11 to secure the bolt 19 in place. This bolt 19 is adjusted so that it may rotate in the tubing 11, as conditions may warrant.

Figure 4:
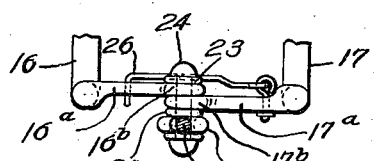
Fig. 4 is a cross-section taken on the line 4—4 of Fig. 1.
Figure 3:
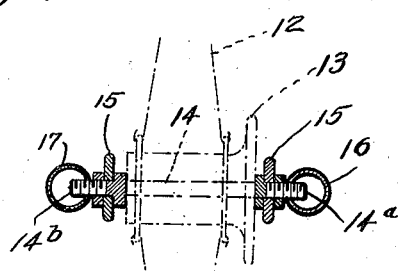
Fig. 3 is a cross-section taken on the line 3—3 of Fig. 1 in which certain inner members of the conventional bicycle rear wheel construction has been indicated in dot-and-dash lines, and which do not bear directly on my present invention.
Figure 5:
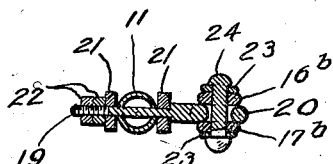
Fig. 5 is a cross-section taken on the line 5—5 of Fig. 2.

The rear pivot point of the fork portions 16a and 17a are mounted over the eye member 20, and under same respectively, in the relation shown in Fig. 4. Washers 23 may be added to the outside surfaces of members 16b and 17b for conventional purposes. Passing through the washers 23, members 16b and 17b, and the eye portion 20 of the bolt 19, is a rivet or bolt member 24 which secures the contacting members together. It will thus be seen that the members 16a and 17a may swing around the rivet member and eye portion 20 of the bolt 19 freely, and at the same time, the combined members 16a, 17a and bolt 19 can rotate in the tubular member 11 freely.

Located between the fork portions 16 and 17 is a tension spring 25 which normally tends to pull these fork members together and thereby prevents them from rattling on the rear axle 14 and at the same time preventing them from becoming disengaged from such axle.

In addition to the spring 25, I have provided a locking latch 26 pivoted in the member 17a and inserted through an opening in the member 16a which definitely prevents the forks 16 and 17 from becoming detached by accident from the rear axle extension members 14a and 14b.

In operation, the bicycle may lean to one side or the other, as in traveling around a curve or when at rest and leaning against an object, as a building etc. and the trailer 10 remains in an upright position because the rivet member 24 permits the bicycle to lean to one side and at the same time the bolt 19 turns in the chassis member 11 thereby providing for a universal movement between the rear axle 14 and the trailer 10.

It is to be understood that I may vary the shape and proportions and substitute equivalent means for the various parts comprising my invention and still be within the spirit of my invention, as set forth in the appended claims.

Having thus described my invention, what I claim as new is:

1. An improved coupling apparatus located between the rear axle of a bicycle and a trailer comprising in combination, a chassis attached to said trailer, an eye bolt member rotatably mounted in the front portion of said chassis, fork members pivoted to said eye bolt member, the free end of said fork members engaged over the ends of said bicycle rear axle, a tension spring located between said fork members and attached at each end to said fork members, a lock latch member, one end being pivoted in one of said fork members between the eyebolt end and the free end the other end of said latch being engaged with the other fork member, for the purpose of locking said fork members against premature removal from said axle member.

2. An improved coupling apparatus located between the rear axle of a bicycle and a trailer comprising in combination, a chassis attached to said trailer, an eye bolt member rotatably mounted in the front portion of said chassis, fork members engaged over the ends of said bicycle rear axle, a tension spring located between said fork members and attached at each end to said fork members, for the purpose of locking said fork members against premature removal from said axle member, and to prevent rattling between the fork members and said axle member.

3. An improved coupling apparatus located between the rear axle of a bicycle and a trailer comprising in combination, a chassis attached to said trailer, an eye bolt member rotatably mounted in the front portion of said chassis, fork members engaged over the ends of said bicycle rear axle, said fork members having a forward depressed portion and rear inwardly bent pivot ends.

4. In a coupling apparatus located between the rear axle of a bicycle, and a trailer chassis, fork members mounted over the ends of said rear axle member, the rear ends of said fork members being pivoted on a rotatable member pivoted in said chassis, a spring member located between and anchored to the inner sides of said fork members, for the purpose of holding said fork members in close contact with said rear axle member.

ALBAN A. DUBAY.